Figure 2:
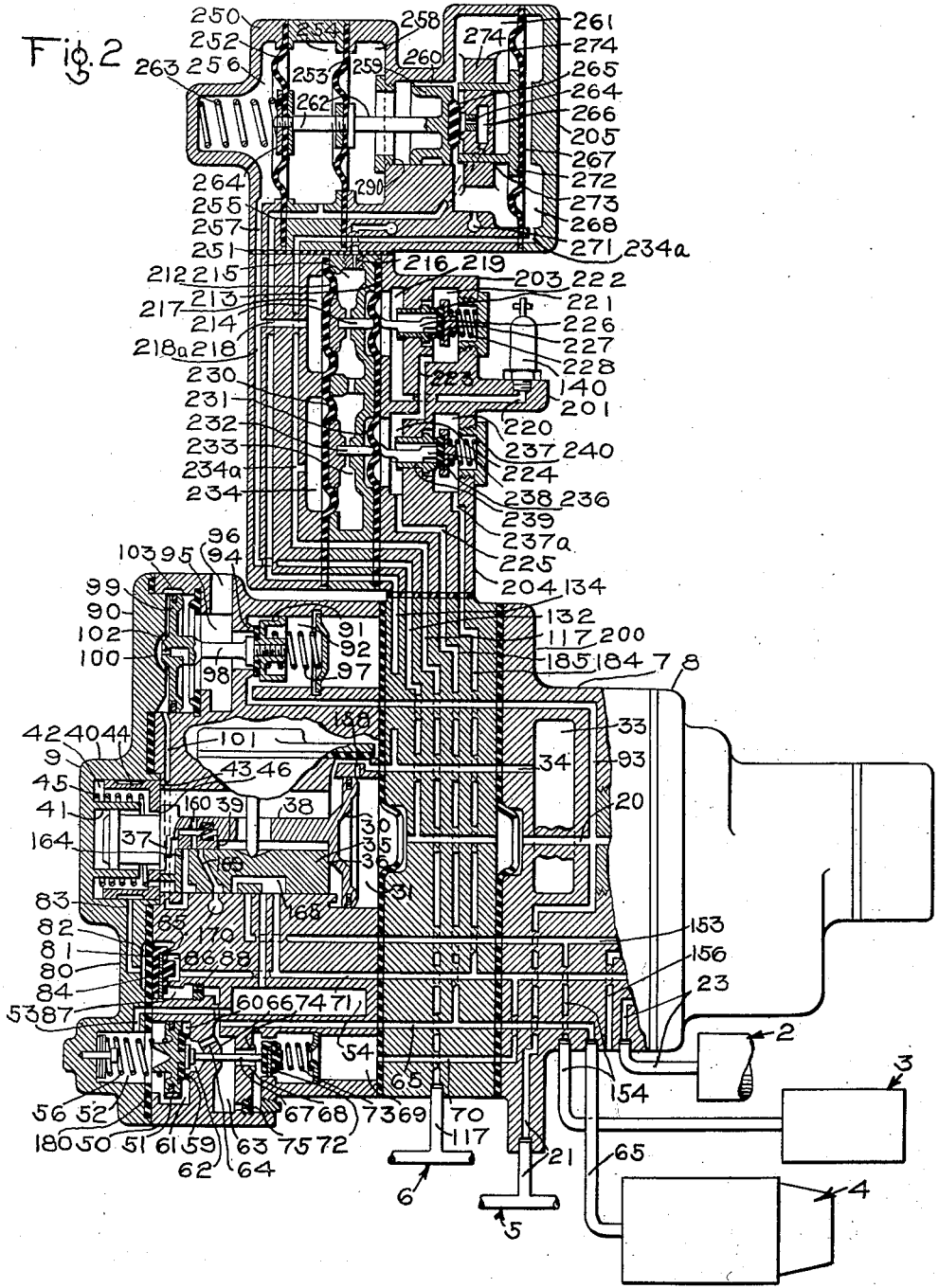

Feb. 20, 1945. J. CANETTA ET AL 2,369,945
FLUID PRESSURE BRAKE APPARATUS
Filed Sept. 14, 1943 2 Sheets-Sheet 1

Fig 1

INVENTORS
JOHN CANETTA
CHARLES F. HAMMER
BY
ATTORNEY

Feb. 20, 1945. J. CANETTA ET AL 2,369,945
FLUID PRESSURE BRAKE APPARATUS
Filed Sept. 14, 1943 2 Sheets-Sheet 2

INVENTORS
JOHN CANETTA
CHARLES F. HAMMER
BY
ATTORNEY

Patented Feb. 20, 1945

2,369,945

UNITED STATES PATENT OFFICE 2,369,945

FLUID PRESSURE BRAKE APPARATUS

John Canetta and Charles F. Hammer, Wilkinsburg, Pa., assignors to The Westinghouse Air Brake Company, Wilmerding, Pa., a corporation of Pennsylvania Application September 14, 1943, Serial No. 502,278

17 Claims. (Cl. 303—23)

This invention relates to fluid pressure brakes, and more particularly to a fluid pressure brake equipment for controlling the application and release of the brakes on cars of a railway train.

On railways there are certain cars which are intended to be used in ordinary freight train service. The well known "AB" brake disclosed in Patent No. 2,031,213, issued February 18, 1936, to Clyde C. Farmer, was designed for controlling the brakes on cars employed in this service. In such trains there is a relatively great amount of slack which must be gathered gently at the time an emergency application of the brakes is effected in order to prevent the development of damaging shocks between cars in the train. The "AB" brake includes a brake cylinder build-up control valve mechanism which functions when an emergency application of the brakes is effected, to provide a limited initial inshot of fluid under pressure at a rapid rate to the brake cylinder to quickly apply the brakes with sufficient force to start the slack in the train to close or gather. The mechanism then functions to supply fluid under pressure to the brake cylinder at a relatively slow rate to insure the gentle gathering of the slack, and finally, said mechanism functions to provide a more rapid flow of fluid under pressure to the brake cylinder to the full emergency degree to bring the train to a stop. This control of brake cylinder pressure is very desirable in that it effectively prevents harsh gathering or closing of the slack and thereby prevents heavy damaging shocks from being created in a long train.

Modern transportation requirements are such that certain cars equipped with the "AB" brake equipment, initially intended only for ordinary freight train service, are now required to operate in relatively short and high speed passenger, freight or express train service in which the run in or closing of the train slack during emergency applications of the brakes does not create damaging shocks, so that an emergency application of the brakes may be effected on such trains at a faster rate than is deemed advisable in ordinary freight train service, without danger of damage by the shocks created by the run in or closing of the train slack.

The "AB" brake equipment also includes an emergency portion which, as is well known by those skilled in the fluid pressure brake art, operates upon an emergency reduction in brake pipe pressure to supply fluid under pressure from a quick action chamber to a brake pipe vent valve for effecting a sudden, local emergency venting of fluid under pressure from a brake pipe. The fluid under pressure is then gradually released from the quick action chamber through a choked passage to permit closure of the vent valve after a period of time sufficient to insure complete venting of fluid pressure from the long brake pipe on such trains. After closure of these vent valves through the train the brakes may be released by recharging the brake pipe on the train.

At the present time there are many cars in service equipped with the "K" type brake equipment which was standard before the advent of the "AB" brake equipment. Freight trains may therefore comprise some cars equipped with the "K" equipment mixed in with cars provided with the "AB" equipment. In the "K" equipment a complete venting of fluid under pressure from the brake pipe in effecting an emergency application of the brakes is not provided for as it is in the "AB" equipment. In order to insure said complete venting on ordinary freight trains it is therefore necessary that the vent valves of the "AB" equipment be held open, as above described, for a period of time which is longer than would otherwise be necessary and this period of time is excessive and undesirable for shorter trains such as passenger, fast freight or express trains, in that at times it might result in an undue delay in getting such trains under way again following an emergency application of the brakes.

Brake equipments for both ordinary freight train service and for short train high speed service are designed to operate on the same pressure ratio basis, i. e., to provide equalization of pressure of fluid in the auxiliary reservoir into the brake cylinder at 50 pounds upon a full service reduction in brake pipe pressure of twenty pounds from a normal seventy pounds which is the common standard employed in freight service. However, in high speed trains the normal brake pipe pressure carried is usually one hundred ten pounds and equalization of such a pressure in the auxiliary reservoir into the brake cylinder would provide an excessive brake cylinder pressure for a full service application of the brakes, in that it might cause sliding of the wheels. A safety valve device has therefore been heretofore employed on brake equipment used in high speed train service to limit the maximum pressure obtainable in the brake cylinder upon a service reduction in brake pipe pressure to a degree such as sixty pounds which, under all normal conditions, would avoid sliding of wheels.

In effecting an emergency application of the brakes the safety valve device is however cut out or rendered uneffective so as to thereby attain the high emergency pressure in the brake cylinder desired to insure prompt stopping of high speed trains.

From the foregoing it will be understood that for ordinary freight train service it is desirable to so control an emergency application of the brakes as to avoid harsh, damaging gathering of slack. It is also desirable to hold the brake pipe vent valves open for a sufficient period of time to insure complete venting of the long brake pipe on such trains. On the other hand, the brake equipment employed on relatively short trains such as used in passenger, fast freight or express service, should provide for a faster emergency application of the brakes, quicker closing of the brake pipe vent valves, and requires the use of a safety valve for limiting the degree of a service application of the brakes.

One object of the invention is to provide an improved brake equipment which is capable of meeting the above described requirements for both relatively slow ordinary freight train service and the shorter, higher speed train service such as passenger fast freight or express service.

This object is attained by using the "AB" type of brake equipment with all its operating characteristics which are particularly suited to the control of long freight trains, and by the addition to said equipment of means adapted to operate only in connection with the shorter trains employed in fast freight or express service to provide the operating characteristics desired therefor.

Another object of the invention is to provide improved brake equipment such as just described embodying means which is automatically adjustable, in accordance with the class of train service in which the equipment is used, to condition the brake equipment to provide the desired operating characteristics for that service.

Short high speed passenger, freight or express trains are provided with a signal pipe which extends through the train and which is normally charged with fluid under pressure to provide for the transmission of signals from one location in the train to another. Ordinary freight trains are not so equipped. According to the last object, the means for automatically conditioning the brake equipment is arranged for control from the signal pipe, so that when a car provided with the improved brake equipment is operated in fast freight or express service it will be automatically conditioned for such service by the pressure of fluid in the signal pipe. The absence of signal pipe pressure in freight trains provide, on the other hand, for the automatic conditioning of the brake equipment for ordinary freight train service.

Other objects and advantages will be apparent from the following more detailed description of the invention.

In the accompanying drawings Fig. 1 is a diagrammatic view of a fluid pressure brake equipment embodying the invention. Fig. 2 is another diagrammatic view, mostly in section, showing another form of the invention.

DESCRIPTION

As shown in Fig. 1 of the accompanying drawings, the brake equipment comprises a brake controlling valve device 1, an auxiliary reservoir 2, an emergency reservoir 3, a brake cylinder 4, a brake pipe 5 and a signal pipe 6.

The brake controlling valve device 1 comprises a pipe bracket 7, a service portion 8 mounted on one face of said bracket, and an emergency portion 9 arranged for mounting on an opposite face of said bracket. According to the invention, the emergency portion is however spaced from the bracket 7 by a filling piece or member 10 which is mounted on the opposite face of said bracket and carries the emergency portion 9. The brake controlling valve device 1 further comprises a changeover valve portion 11 mounted on the filling piece 10.

The service and emergency portions 8 and 9 and the pipe bracket 7 may be identical in all respects to the corresponding parts of the "AB" brake equipment fully disclosed in the aforementioned Farmer patent, although in the present application only those parts of the portions are shown and will hereinafter be described that are deemed essential to an understanding of the invention. The filling piece or member 10 is provided with suitable through passages connecting corresponding passages in the pipe bracket 7 and emergency valve portion 9 in order that the emergency valve portion will operate in the usual manner.

The service portion 8 comprises a casing containing a piston 18 having at its face adjacent the pipe bracket 7 a chamber 19 which is in constant open communication with the brake pipe 5 by way of a passage 20 and a connected passage and pipe 21. At the opposite side of piston 18 there is a valve chamber 22 which is in constant open communication with the auxiliary reservoir 2 by way of a passage and pipe 23. In chamber 22 there is a main slide valve 24 mounted between two spaced shoulders 25 and 26 provided on a stem 27 associated with the piston 18. An auxiliary slide valve 28 is mounted to slide on the main slide valve 24 and is disposed in a recess provided in the piston stem 27 for movement with said stem.

The emergency portion 9 comprises a casing containing a piston 30 having at its face adjacent the filling piece or member 10 a chamber 31 which is in constant open communication with the brake pipe through the passage 20 and connected passage and pipe 21. At the opposite side of the piston 30 there is a valve chamber 32 which is in constant open communication with a quick action chamber 33 in the pipe bracket 7, through a passage 34 extending through the filling piece or member 10. Contained in valve chamber 32 is a main slide valve 35 which is loosely mounted between two spaced shoulders 36 and 37 provided on a stem 38 projecting from the piston 30. An auxiliary slide valve 39 is disposed in a recess in the piston stem 38 for movement therewith and is mounted to slide on the main slide valve 35.

The left-hand end of chamber 32 is closed by a cover 40 having a sleeve like projection 41 in axial relation to piston 30 and in which the end of piston stem 38 is slidably guided. Encircling this extension is an annular chamber 42 of greater diameter than chamber 32 in order to provide at their meeting ends an annular shoulder 43. A plunger 44 is slidably mounted in chamber 42 and is urged by a spring 45, also mounted in said chamber, into engagement with the shoulder 43. The piston stem 38 loosely extends through the plunger 44 and is provided with a shoulder 46 engaging said plunger to define the normal release position of the piston 30 and slide valves 35 and 39 with the plunger 44 in contact with the shoulder 43. Other functions of the plunger 44 and spring 45 are not pertinent to the invention and further description thereof will therefore be omitted.

Associated with the emergency portion is a brake cylinder build-up control valve mechanism 50 which comprises a piston 51 slidably mounted in a bore the outer end of which is closed by the cover 40. At the left-hand side of piston 51 is a chamber 52 connected by a passage 53 with a chamber 54 which in turn is connected by a passage 55 to the seat of the emergency main slide valve 35. The chamber 52 contains a spring 56 which acts on the piston 51 for urging same in the direction of the right-hand into engagement with an annular seat rib 59. With the piston 51 engaging the seat rib 59, a chamber 60 formed around said rib is open through a passage 61 to chamber 52. Within the seat rib 59 is a chamber 62 which is in constant open communication with a chamber 63 through a passage 64. The chamber 63 is in constant open communication with the brake cylinder 4 through a passage and pipe 65.

The chambers 62 and 63 are separated by a wall 66 through which the passage 64 extends. A stem 67 having one end connected to the piston 51 extends through a bore in the wall 66 and through chamber 63 and a relatively large opening 68 into a chamber 69 which is connected by a passage 70 to a brake application and release passage 71 one end of which terminates at the seat for the service slide valve 24 and which is also connected to the seat for the main emergency slide valve 35. In chamber 69 the stem 67 engages a check valve 72 and is operative to unseat same from an annular seat rib 74, encircling the adjacent end of passage 68, with piston 51 in contact with seat rib 59. A spring 73 in chamber 69 is operative upon movement of piston 51 away from the seat rib 59 to urge the check valve 72 into sealing contact with the seat rib 74. The chambers 63 and 69 are constantly connected through a relatively restricted port 75.

The emergency portion 9 also embodies a timing valve device 80 which comprises a flexible diaphragm 81 clamped between the cover 40 and the casing and having at one side a chamber 82 which is in constant open communication with the emergency valve chamber 32 by way of a passage 83 and chamber 42 containing the plunger 44. A check valve 84 is associated with the opposite side of the diaphragm 81 and is adapted to be urged by the diaphragm under the influence of fluid pressure in chamber 82 into contact with an annular seat rib 85. Within the seat rib 85 is a chamber 86 which is in constant open communication with the brake application and release passage 71. Encircling the rib 85 is a chamber 87 which is open through a choke 88 to the brake cylinder passage 65. Under a condition to be later described, the diaphragm 81 is adapted to deflect in the direction of the left-hand to provide for movement of check valve 84 out of contact with seat rib 85 for establishing communication between the application and release passage 71 and the brake cylinder passage 65.

The emergency portion also embodies a brake pipe vent valve device 90 which comprises a valve 91 contained in a chamber 92 which is open to the brake pipe 5 through a passage 93, passage 20 and passage and pipe 21. One side of this valve is arranged to cooperate with an annular seat rib 94 for closing communication between the brake pipe chamber 92, and a chamber 95 which is open to the atmosphere through a passage 96. A spring 97 in chamber 92 acts on the valve for urging same into seating contact with the seat rib 94. The valve 91 is connected by means of a stem 98 to a piston 99 one side of which piston is subject to atmospheric pressure in chamber 95. At the opposite side of the piston there is a chamber 100 connected by a passage 101 to the seat for the main emergency slide valve 35. The piston 99 is provided with a choked release port 102 which connects chamber 101 to chamber 95 and there is also a leakage groove 103 provided in the wall of the bore in which the piston operates for connecting said chambers when the piston is in its normal position in which it is shown.

As hereinbefore mentioned the filling piece or member 10 is inserted between the pipe bracket 7 and emergency portion 9 and carries the changeover valve portion 11. The changeover valve portion embodies a control valve mechanism 110 which is adapted to be controlled by or conditioned in accordance with the pressure of fluid in the signal pipe 6, and a valve mechanism 111 which is adapted to be controlled by or conditioned in accordance with the pressure of fluid in the brake pipe 5.

The control valve mechanism 110 comprises a flexible diaphragm 115 having at one side thereof a chamber 116 which is in constant open communication with the signal pipe 6 through a passage and pipe 117. At the opposite side of diaphragm 115 there is a valve chamber 118 which is in constant open communication with the atmosphere by way of a passage 119.

Contained in valve chamber 118 is a slide valve 120 which is connected through the medium of a stem 122 to the diaphragm 115 for movement therewith, said slide valve being urged against the slide valve seat by a spring 123 acting through the medium of a plunger 124. A spring 125 in the valve chamber 118 acts on stem 122 for urging the stem, associated slide valve 120 and diaphragm 115 to the position in which they are shown in the drawings. This is the position which the slide valve 120 will assume in long freight trains on which there is no signal pipe for connecting to signal pipe 6 of the equipment shown, consequently this signal pipe 6 will be open to the atmosphere.

When, however, a car equipped with this brake controlling valve device is coupled in a fast freight or express train in which a signal pipe is provided which extends throughout the length of the train, fluid under pressure supplied to said pipe and thereby pipe 6 will flow to diaphragm chamber 116 in the changeover portion 11. This pressure acting on the diaphragm 115 will deflect the diaphragm in a direction toward the right-hand from the position in which it is shown in the drawings. Deflection of the diaphragm in this direction will cause the attached stem 122 and associated slide valve 120 to move in the same direction against the opposing pressure of spring 125 until brought to a stop by the stem 122 engaging a stop 126 on the casing, in which position they will be maintained as long as the signal pipe 6 is maintained charged with fluid under pressure. From the foregoing it will be understood that the slide valve 120 has two operating positions namely the position in which it is shown for use when a car equipped with this brake controlling valve device is coupled into a long freight train, and a position to the right of that shown for use when the car is used in short relatively high speed freight or express train service.

The valve mechanism 111 comprises a flexible diaphragm 130 which is clamped around its periphery in the casing and which has at one side a chamber 131 which is in constant open communication with the brake pipe 5 by way of a passage 132, passage 20 and passage and pipe 21. At the opposite side of the diaphragm 130 there is a valve chamber 133 which is in constant open communication with the quick action chamber 33 by way of a passage 134 and passage 34.

Contained in valve chamber 133 is a slide valve 135 which is connected through the medium of a stem 136 to the diaphragm 130 for movement therewith, said slide valve being urged against the slide valve seat by a spring 137, acting through the medium of a plunger 138.

Associated with the changeover valve portion 11 is a safety valve device 140 which is so adjusted as to limit the degree of a service application of the brakes when the brake controlling valve device is employed on a car operating in high speed freight or express service in which one hundred ten pounds brake pipe pressure may be carried. The safety valve device 140 is connected by way of a passage 141 to the seat for the slide valve 135.

OPERATION

If a car provided with this equipment is coupled into a long freight train which, as well known, is not provided with a signal pipe, the signal pipe 6 on the car will be devoid of fluid under pressure and chamber 116 at the outer face of the diaphragm 115 in the control valve mechanism 110 of the changeover portion 11 will therefore be open to the atmosphere. Under this condition the spring 125 acting through the medium of the stem 120 will maintain the slide valve 120 and the diaphragm 115 in the position in which they are shown. The slide valve 120 is provided with a cavity 144 and a cavity 145 but in the position shown for ordinary freight train operation no communications are established through these cavities.

In the valve mechanism 111 of the changeover portion 11 the diaphragm 130 is controlled by the opposing pressures of the quick action chamber and the brake pipe. Since these pressures are equal when the equipment is charged with fluid under pressure, as hereinafter described, the diaphragm 130 and associated stem 136 and slide valve 135 will be maintained in the position shown so long as brake pipe pressure in chamber 131 is not reduced enough below quick action chamber pressure in chamber 133 to permit the quick action chamber pressure to overcome slide valve friction and move the diaphragm and thereby the slide valve into a position to the left of that in which it is shown in Fig. 1. The only communication established with the slide valve in its normal position as shown is through a cavity 149 between passage 141 leading to the safety valve 140 and a passage 150 leading to the seat for the slide valve 120 in the control mechanism 110 of the changeover valve portion, but this is of no consequence at this time since the passage 150 is lapped by slide valve 120 as shown.

With the changeover valve portion 11 of the brake controlling valve device 1 conditioned as shown in the drawings, due to the lack of signal pipe pressure in diaphragm chamber 116, no communications are established which will in any way change the operation of the "AB" brake equipment. Thus in ordinary freight trains the brake equipment on the car will operate to provide the desired operating characteristics for that class of service as described in the aforementioned Farmer patent, but which will now be set forth briefly.

ORDINARY FREIGHT TRAIN SERVICE—INITIAL CHARGING

To initially charge the brake equipment fluid under pressure is supplied to the brake pipe 5 in the usual manner and flows therefrom through pipe and passage 21 and passage 20 to the service piston chamber 19 and the emergency piston chamber 31. Fluid under pressure thus supplied to passage 21 also flows through passage 93 to the vent valve chamber 92 and through passage 132 to chamber 131 in the valve mechanism 111 of the changeover valve portion 11 to charge these chambers with fluid at brake pipe pressure.

With the several parts of the service portion 8 in their normal release position as shown in the drawings, fluid under pressure supplied to chamber 19 will flow around the piston 18 through feed groove 15 to the valve chamber 22 and thence through passage and pipe 23 to the auxiliary reservoir 2. Fluid under pressure also flows from chamber 22 to the emergency reservoir 4 by way of a port 152 in the main slide valve 24, a passage 153 and a passage and pipe 154.

In this position of the main slide valve 24 the brake cylinder 4 is open to the atmosphere through pipe and passage 65, chamber 63 in the delay valve mechanism 56, past the check valve 72 to chamber 69 and thence through passages 70 and 71, a release cavity 155 in the main slide valve 24 and passage 156 which leads to the atmosphere.

With the several parts of the emergency portion 9 in their normal release position as shown, fluid under pressure supplied to the piston chamber 31 will flow therefrom through a restricted feed port 158 to passage 34 and through said passage in one direction to the emergency valve chamber 32 and in the opposite direction to the quick action chamber 33. Fluid under pressure thus supplied to passage 34 will also flow therefrom to the valve chamber 133 in the changeover valve portion 11 by way of passage 134. With the valve chamber 133 thus charged with fluid under pressure at quick action chamber pressure and the chamber 131 at the opposite side of diaphragm charged with fluid at brake pipe pressure, the diaphragm 130, stem 136 and slide valve 135 will be maintained in its normal position in which it is shown so long as brake pipe pressure in chamber 131 is not reduced enough below quick action chamber pressure in chamber 133 to permit the quick action chamber pressure to overcome the friction of the slide valve 135.

With the main emergency slide valve 35 in its normal position as shown, passage 101 is connected to a port 164 in said slide valve which leads to the seat for the auxiliary slide valve 39 where it is lapped or closed. Under this condition chamber 100 at the left-hand side of the vent valve piston 99 will be atmospheric pressure due to the connection through port 102 and groove 103 with chamber 95 which is open to the atmosphere. As a result spring 97 will hold the vent valve 91 seated against rib 94 so that chamber 92 will be charged with fluid at brake pipe pressure.

With the emergency main slide valve 35 in its normal position as shown, a cavity 165 therein connects passage 55 to the brake application and release passage 71 which is open to the atmosphere through the service slide valve 24, as above described. As a result, chamber 54 and thereby connected chamber 52 will both be at atmospheric pressure, and since chamber 62 at the opposite side of said piston is open to the atmosphere along with the brake cylinder 4, spring 56 will be effective to hold the piston 51 in engagement with seat rib 59 to thereby position stem 67 for holding the check valve 72 out of contact with the seat rib 74. Chamber 86 at one side of the timing valve diaphragm 81 is at this time open to the atmosphere through the application and release passage 71 and thence by way of the service slide valve 24, while chamber 87 encircling said rib is also open to the atmosphere at this time by way of port 88 and passage 65 along with the brake cylinder 4. As a result, the pressure of fluid from the emergency valve chamber 32, effective in chamber 82 on the opposite side of the timing valve diaphragm 81, will hold the check valve 84 in sealing engagement with the seat rib 85 to thereby close communication between chambers 86 and 87 within and around, respectively, the seat rib 85.

ORDINARY FREIGHT TRAIN SERVICE—SERVICE APPLICATION OF BRAKES

With the equipment fully charged as just described, if the engineer desires to effect a service application of the brakes, he will effect a service reduction in the pressure of fluid in brake pipe 5, in the usual well known manner. The pressure of fluid in piston chamber 19 of the service portion 8 will then reduce at a service rate along with the reduction in pressure of fluid in brake pipe 5, and since this rate is in excess of that at which auxiliary reservoir pressure in valve chamber 22 can reduce by flow back to chamber 19 through feed groove 15, a differential of pressure will be created on the piston 18 which will effect movement thereof to its service application position defined by contact between said piston and the left-hand end of the bore in which the piston operates.

As the service piston 18 is thus moved in the direction of its application position, it initially moves the auxiliary slide valve 28 relative to the main slide valve 24 for closing communication between the emergency charging port 152 and valve chamber 22 and for opening communication between said valve chamber and a service application port 167 in the main slide valve 24. At substantially the same time as the service port 167 is thus opened to the valve chamber 22, the shoulder 26 on the piston stem 27 engages the end of the main slide valve 24. The piston as it moves further toward its service position will now move said main slide valve to its service position in which the service port 167 registers with the brake application and release passage 71.

Fluid under pressure will then flow from valve chamber 22 and thereby the connected auxiliary reservoir 2 to the application and release passage 71 and thence through passage 70 to check valve 69 in the delay valve device 50 and also to the seat of the emergency main slide valve 35. With the slide valve 35 in its normal position as shown, in which it will remain during a service application of the brakes, the cavity 165 connects the passage 71 to passage 55, so that fluid supplied to passage 71 will flow to chamber 54 and thence through passage 53 to chamber 52 at the left-hand side of the delay valve piston 51. At the same time this occurs, fluid under pressure supplied to the check valve chamber 69 will flow past the check valve 72 to chamber 63 and thence through passage 64 to chamber 62. The fluid pressure thus acting on opposite sides of piston 51 will be balanced so that spring 56 will, under this condition, maintain the piston in its right-hand position as shown and thereby maintain the check valve 72 in its unseated condition as shown. The fluid under pressure supplied from the auxiliary reservoir to the check valve 69 will therefore flow past the check valve 72 through the relatively large opening 68 to chamber 63 and thence through passage 65 to the brake cylinder 4 for effecting a service application of the brakes on the car.

Fluid under pressure will continue to flow from the auxiliary reservoir to the brake cylinder 4 until the auxiliary reservoir pressure in valve chamber 22 becomes reduced to a degree slightly lower than the reduced brake pipe pressure effective in piston chamber 19, if the reduction in brake pipe pressure is less than a full service reduction, the piston 18 will then be moved by brake pipe pressure toward the right-hand relative to the main slide valve 24 for shifting the auxiliary slide valve 28 to a lap position for closing communication between valve chamber 22 and the service application passage 167 in the main slide valve 24.

The degree of pressure obtained in the brake cylinder 4 will thus be limited in accordance with the degree of service reduction in brake pipe pressure effective in piston chamber 19. If less than a full service reduction in brake pipe pressure is effected, a further reduction will effect the operation of piston 18 and auxiliary slide valve 28 to provide a corresponding increase in pressure in the brake cylinder in the usual manner. The maximum brake cylinder pressure is, however, obtained upon a full service reduction in brake pipe pressure, which in ordinary freight train service will be a 20 pound reduction from a normal 70 pounds pressure in the brake pipe. Upon such a reduction in brake pipe pressure, the pressure of fluid in the auxiliary reservoir 2 will equalize into the brake cylinder 4 at substantially 50 pounds.

Upon a service reduction in brake pipe pressure in piston chamber 31 of the emergency portion 9, the emergency piston 30 will move toward the right-hand to shift the auxiliary slide valve 39 relative to, the main slide valve 35 to a position in which a port 168 in the auxiliary slide valve registers with a port 169 in the main slide valve, the port 169 in turn registers with an atmospheric vent port 170 with the main slide valve in its normal position as shown. Through this communication fluid under pressure will flow from the valve chamber 32 and quick action chamber 33 at the same rate as the service rate of reduction in brake pipe pressure in piston chamber 31, whereby movement of the piston will be stopped without shifting the main slide valve 35. When the pressure in valve chamber 32 and quick action chamber 33 is thus reduced to a degree slightly below the brake pipe pressure effective in piston chamber 31 the emergency piston 30 will be moved toward the left-hand and thereby shift the auxiliary slide valve 39 back to its normal position shown for closing communication between port 168 therein and port 169 in the main slide valve to thereby limit the reduction in pressure in said chamber to substantially the same degree as that of the brake pipe. In other words, upon a service reduction in brake pipe pressure the emergency portion will operate only to reduce the pressure in the valve chamber 32 and quick action chamber 33, in accordance with the reduction in the brake pipe pressure.

Upon a service rate of reduction in the pressure of fluid in brake pipe 5 and quick action chamber 33, as just described, the pressure of fluid in chambers 131 and 133 at opposite sides of the diaphragm 130 in the valve mechanism 111 of the changeover valve portion 11 is also reduced. The flow of fluid under pressure from chamber 131 to the brake pipe is by way of passages 132 and 20 and passage and pipe 21. The flow of fluid under pressure from chamber 133 is by way of passage 134, passage 34, emergency valve chamber 32, port 168 in the auxiliary slide valve 39, port 169 in the main slide valve 35 and port 170. It will be noted that the pressure of fluid in chamber 133 reduces with the pressure of fluid in emergency valve chamber 32, which latter pressure reduces at the same rate as the pressure of fluid in chamber 131 is reduced during a service application of the brakes, and thereby prevents obtaining a sufficient differential of pressures on the diaphragm 130 to cause said diaphragm to deflect from the position in which it is shown.

From the foregoing description it will be understood that upon effecting a service reduction in brake pipe pressure the brake pipe pressure in chamber 131 and quick action chamber pressure in chamber 133 in the changeover valve portion 11 will be reduced at the same rate and that the diaphragm 130, stem 136 and slide valve 135 will remain in the position shown. Thus in ordinary freight train service the changeover valve portion 11 will remain inoperative and the brake controlling valve device 1 will operate as above described to provide a service application of the brakes in harmony with the other cars in the train.

ORDINARY FREIGHT TRAIN SERVICE—RELEASE OF BRAKES AFTER A SERVICE APPLICATION

To effect a release of brakes after a service application, fluid under pressure is again supplied to the brake pipe 5 to restore the brake pipe pressure to the normal degree. As a result of an increase in pressure in brake pipe 5 the pressure in chamber 131 of the changeover valve portion 11 is increased through the circuit hereinbefore traced in the description of initial charging. The consequent increase in pressure in the piston chamber 19 will move the service piston 18 and thereby the slide valves 24 and 28 back to their normal position in which they are shown. In this position the auxiliary reservoir 2 and emergency reservoir 3 will be recharged with fluid under pressure from the brake pipe and the brake cylinder 4 will be opened to the atmosphere for effecting a release of the brakes, as above described in connection with initial charging of the equipment. The emergency portion provides for the restoration of the pressure in valve chamber 32, quick action chamber 33 and connected valve chamber 133 in the changeover valve portion 11 as the brake pipe pressure is increased to that normally carried.

The brakes on the train will now be released and the brake system fully recharged with fluid under pressure for a subsequent brake operation, as will be apparent.

ORDINARY FREIGHT TRAIN SERVICE—EMERGENCY APPLICATION OF THE BRAKES

If the engineer desires to effect an emergency application of the brakes, he will initiate, at the locomotive, a sudden emergency reduction in pressure of fluid in the brake pipe 5 in the usual manner. In response to this reduction in brake pipe pressure the service portion of the brake controlling valve device 1 functions to supply fluid under pressure from the auxiliary reservoir 2 to the brake cylinder 4 in the same manner as hereinbefore described in connection with a service application of the brakes. If the brake controlling valve device 1 is on the car next to the locomotive, the emergency piston 30 therein will respond to the reduction in the brake pipe pressure initiated by the engineer and move the auxiliary slide valve 39 relative to the main slide valve 35 to its service position above described in which ports 168 and 169 are in registry. The flow capacity of these ports is however insufficient to reduce the pressure in valve chamber 32 and quick action chamber 33 as fast as the brake pipe pressure is being reduced, so that a differential of pressure will be promptly obtained on the emergency piston for moving same from service position to an emergency position at the right-hand end of the bore in which it operates. During this movement of the piston 30, the shoulder 37 at the left-hand end of the piston stem 38 will engage the main slide valve 35 and move it to emergency position.

At the time shoulder 37 on the piston stem 38 engages the main slide valve 35, the auxiliary slide valve 39 opens passage 164 to valve chamber 32. This passage at the seat for the main slide valve registers with passage 101 leading to the vent valve piston chamber 100, so that flow of fluid under pressure from valve chamber 32 and quick action chamber 33 to the vent valve piston chamber 100 will occur. When the main slide valve 35 is however moved to its emergency position passage 101 is open past the end of slide valve 35 to chamber 32 to provide for further flow of fluid under pressure to the vent valve piston chamber 100.

The pressure of fluid thus obtained in chamber 100 on the face of the vent valve piston 99 will effect movement of said piston in the direction of the right-hand to move the brake pipe vent valve 91 out of contact with seat rib 94, thereby opening communication between the brake pipe passage 93 and chamber 95 which is open to the atmosphere through passage 96. Through this communication fluid under pressure will then be vented from the brake pipe at an emergency rate for causing the emergency portion 9 on the next car in the train to operate in the same manner as above described, and thus propagate the emergency action through the train in the usual manner.

In the emergency position of the emergency piston 30 and main slide valve 35, the passage 55 is lapped by said valve so as to prevent the flow of fluid under pressure to chamber 54 and chamber 52 at the left-hand side of the delay valve piston 51. At the same time as this occurs, passage 154 connected to emergency reservoir 3 is opened through cavity 165 in said valve to the application and release passage 71, so that both the auxiliary and emergency reservoirs are placed in communication with said passage and thereby with passage 70 leading to check valve chamber 69 in the delay valve mechanism 50. Fluid under pressure thus supplied to check valve chamber 69 from both the auxiliary and emergency reservoirs will then flow past check valve 72 through the relatively large opening 68 to chamber 63 and thence through passage 65 to the brake cylinder 4 for initiating the emergency application of the brakes.

At the same time as fluid is thus supplied to the brake cylinder from chamber 63, fluid also flows from said chamber through passage 64 to chamber 62 at the right-hand face of the delay valve piston 51. Under this condition, chamber 52 at the opposite side of piston 51 is not supplied with fluid under pressure so that only the pressure of spring 56 on said piston will oppose the pressure of fluid in chamber 62 at the opposite side of the piston. The pressure of spring 56 is such that when the pressure of fluid obtained in chamber 62 and thereby in the brake cylinder device 4 is increased to a certain relatively low degree, such as 15 pounds, this pressure will move the piston 51 in the direction of the left-hand into engagement with a gasket 180 whereupon spring 73 will seat the check valve 72 so as to prevent further flow of fluid under pressure from chamber 69 through the relatively large opening 68 to the brake cylinder at the rate at which fluid is supplied to the brake application and release passage by both the service and emergency portion 8 and 9.

After the check valve 72 is seated as just described, fluid under pressure supplied to chamber 69 by the service and emergency portions will continue to flow to the brake cylinder 4 at a restricted rate by way of port 75 which by-passes the seated check valve 72, thus providing for a continued but relatively slow increase in pressure in the brake cylinder 4.

While fluid under pressure is being supplied to the brake cylinder as just described, the pressure in the emergency valve chamber 32 and quick action chamber 33 is being gradually reduced to the atmosphere by way of the restricted port 102 through the vent valve piston 99, and as a consequence, the pressure in chamber 82 at the left-hand side of diaphragm 81 in the timing valve device 80 is also being correspondingly reduced. At the opposite side of diaphragm 81, the check valve 84 is at this time subject, in chamber 86, to the pressure of fluid effective in the brake application and release passage 71, and in chamber 87, outside of the seat rib 85, to brake cylinder pressure. The parts of the timing valve device are so proportioned that after the pressure in the brake cylinder has been increased to a certain degree by the relatively slow flow of fluid through the restricted part 75, the forces on the right-hand side of the diaphragm will over-balance that on the left-hand side and cause deflection of the diaphragm toward the left-hand for unseating the check valve 84. With the check valve 84 thus unseated, the brake application and release passage 71 is connected through the choke 88 to the brake cylinder passage 65, and through this communication fluid under pressure will then flow to the brake cylinder in addition to the supply through the restricted port 75, to thereby provide for an acceleration in the rate of increase in brake cylinder pressure. The degree of pressure obtained in the brake cylinder for effecting an emergency application of the brakes is limited to equalization between the brake cylinder, auxiliary reservoir and emergency reservoir, as will be apparent.

From the above description it will now be noted that in effecting an emergency application of the brakes there is initially a limited rapid inshot of fluid under pressure to the brake cylinder 4 past the open check valve 72, followed by a relatively slow rate of supply governed by the flow capacity of the restricted port 75, and finally there is an increase in the rate of supply through choke 88 upon unseating of the timing check valve 84, the final supply being by way of both the port 75 and choke 88.

The purpose of the initial limited but rapid inshot of fluid pressure to the brake cylinder is to provide an application of the brakes of such degree as to cause a gentle running in of the slack in a long freight train so as to avoid the creation of damaging shocks in the train. The gradual supply to the brake cylinder by way of restricted port 75 then provides for a gradual increase in pressure in the brake cylinder 4 to insure gentle gathering of the slack, and the final increase in the rate of supply provided by the restricted port 75 and choke 88 to the full emergency degree to provide for prompt stopping of the train after the slack has been gathered. As before pointed out, the controlled increase in brake cylinder pressure in effecting an emergency application of the brakes on a long train as just described insures the stopping of the train without damaging slack action occurring.

In effecting an emergency reduction in brake pipe pressure to cause an emergency application of the brakes as just described, the brake pipe pressure in chamber 131 will also be reduced at an emergency rate and quick action chamber pressure in chamber 133 of the changeover valve portion 11 will be reduced along with the pressure of fluid in emergency valve chamber 32 and quick action chamber 33 through the port 102 in the emergency vent valve piston 99. The capacity of port 102 in vent valve piston 99 is however insufficient to reduce the pressure in valve chamber 133 as fast as the brake pipe pressure is being reduced in diaphragm chamber 131, so that sufficient differential of pressure will be obtained on the diaphragm 130 for flexing it in a direction toward the left-hand until brought to a stop by the follower engaging the wall 146 of the casing. Flexing of the diaphragm 130 in a direction toward the left-hand causes the stem 136 and attached slide valve 135 to move in the same direction until brought to a stop by the diaphragm follower engaging the casing. With the slide valve in this position a passage 181 extending through the stem 136 and slide valve 135 will move into registration with a passage 182 in the seat but this is of no consequence at this time since the passage 182 is lapped by slide valve 120 in the control mechanism 110 as shown.

Movement of the slide valve 135 to its left-hand position also cuts off communication between passages 141 and 150 in the slide valve seat, but this disconnecting of passages 141 and 150 in ordinary freight train service serves no useful purpose.

When, in effecting an emergency application of the brakes, the pressure of fluid in emergency valve chamber 32 and quick action chamber 33 is sufficiently reduced through the choke 102 in the vent valve piston 99, the spring 97, acting on the vent valve 91, will seat said valve and return the piston 99 to its normal position shown to provide for recharging of the brake equipment for effecting a release of brakes after an emergency application, whenever such is desired. The volume of the emergency valve chamber 32 and the quick action chamber 33 are so related to the venting capacity of port 102 in the vent valve piston 99 however that the vent valve 91 will be held open for a sufficient period of time to insure complete venting of all fluid from the brake pipe 5 in freight trains, to thereby insure an emergency application of the brakes throughout the length of the train.

ORDINARY FREIGHT TRAIN SERVICE—RELEASE OF THE BRAKES AFTER AN EMERGENCY APPLICATION

In order to effect a release of the brakes after an emergency application, fluid under pressure is again supplied to the brake pipe 5 and thereby the diaphragm chamber 131 in the changeover valve portion 11, service piston chamber 19 and the emergency piston chamber 31.

It will be noted that since the quick action chamber pressure in valve chamber 133 is vented to the atmosphere during the emergency application an increase in brake pipe pressure in chamber 131 sufficient to overcome the friction of the slide valve 135 will cause the diaphragm 130 and thereby the slide valve 135 to return to normal position in which they are shown.

The consequent increase in pressure in the service piston chamber over the opposing reduced auxiliary reservoir pressure in valve chamber 22 will return the piston 18 and thereby the slide valves 24 and 28 to their normal release position in which the brake cylinder 4 is opened to the atmosphere as above described for effecting a release of the brakes. Also in this position fluid under pressure is again supplied from the brake pipe to the valve chamber 22 and thence to the auxiliary reservoir 2 and emergency reservoir 3 for recharging same to the pressure in the brake pipe.

The increase in brake pipe pressure on the emergency piston 30 will return same and thereby the slide valves 39 and 35 to their normal positions in which the valve chamber 32, the quick action chamber 33 and the valve chamber 133 in the changeover valve portion 11 will be recharged with fluid at the pressure in the brake pipe. Upon this recharging of the emergency valve chamber 32 the corresponding increase in pressure in chamber 82 at the left-hand side of the timing diaphragm 81 will return the check valve 84 into sealing contact with seat rib 85, and the pressure both inside and outside of said seat rib will be reduced to that of the atmosphere along with the venting of fluid under pressure from the brake cylinder 4. In other words, the different parts of the brake controlling valve device I will now be conditioned in the positions in which they are shown in the drawings.

SUMMARY

Ordinary freight train service

From the above description it will now be noted that when a car provided with the brake controlling valve device I is coupled in an ordinary freight train, said device will operate like the "AB" brake equipment without the present invention embodied therein to provide, through the medium of the emergency delay valve mechanism 50, a controlled three stage increase in pressure in the brake cylinder 4 to effect an application of the brake and at the same time provide for gentle gathering of slack in the train.

It will also be noted that the safety valve device 140 does not interfere with or change the operation of the brake controlling valve device I in ordinary freight train service in any way, so that its operating characteristics in both service and an emergency application of the brakes remain like that of the usual "AB" brake equipment.

Short train high speed service

When a car equipped with the brake controlling valve device I is coupled into a short high speed passenger, freight or express train, the charging of the signal pipe on the train will provide fluid under pressure in chamber 116 of the control valve mechanism 110 of the changeover portion 11. This pressure acting on the diaphragm 115 will deflect same in a direction toward the right-hand and thus, through the medium of stem 122, move the slide valve 120 from its ordinary freight train operating position in which it is shown in the drawings to the short train operating position.

In this short train operating position of the slide valve 120, cavity 144 therein connects passage 182 leading from the seat for the slide valve 135 of the valve mechanism 111 to a passage 183 leading to the atmosphere for a purpose presently described. In this position of the slide valve 120 the cavity 145 therein connects a passage 184 leading from the application and release passage 71 to a passage 185 leading to the brake cylinder passage 65 thereby opening a by-pass around the restricted port 75 in the emergency delay valve mechanism 50 and the restricted port 88 in the timing valve mechanism 80. As a result, when an emergency application of the brakes is effected as above described, fluid under pressure will be supplied to the brake cylinder 4 by way of application and release passage 71, passage 184, cavity 145, in the slide valve 120 of the control valve mechanism 110, passage 185 and brake cylinder passage 65 at the relatively rapid rate desired in high speed short train operation to ensure prompt stopping of the train; the emergency delay mechanism 50 being thus rendered ineffective to limit the rate of supply of fluid to the brake cylinder although it will operate in high speed train operation in the same manner as in ordinary freight train service as above described.

Upon an emergency reduction in brake pipe pressure, the valve mechanism 111 of the changeover valve portion 11 is caused to move from its normal position in which it is shown to its other operating position as previously described in connection with an emergency application of the brakes on a long train. With the slide valve 135 in its other operating position, port 181 which extends through the stem 136 and slide valve 135 connects passage 182 to valve chamber 133 so that fluid under pressure in the connected emergency valve chamber 32 and the quick action chamber 33 is vented to the atmosphere by way of passages 34 and 134, chamber 133 in the valve mechanism 111 port 181 in stem 136 and slide valve 135, passage 182, choke 185 in said passages, cavity 144 in the slide valve 120 of the control valve mechanism 110 and atmospheric passage 183 in addition to the venting of fluid under pressure through port 102 in the vent valve piston 99 and thus permit quicker release of the brakes after an emergency application than is obtainable on ordinary freight trains as above mentioned.

From the foregoing description of the operation of the valve mechanism 111 in ordinary freight train service it will be understood that the slide valve 135 of this mechanism will remain in its normal position at all times except when the brake pipe pressure acting in chamber 131 is reduced at a rate exceeding that effected when effecting a service application of the brakes. With the slide valve 135 in its normal position as shown the safety valve 140 is connected by way of passage 141 and cavity 149 in the slide valve 135 to the passage 150 and with the chamber 116 of the valve mechanism 110 charged with fluid at signal pipe pressure the slide valve 120 in valve mechanism 110 will be positioned so that cavity 145 therein will connect passage 150 to passage 184 and thereby the brake application and release passage 71. With this communication established it will be apparent that the safety valve 140 is connected to the brake cylinder 4 and will be effective to limit the degree of pressure obtained in the brake cylinder 4 upon a service application of the brakes on short high speed passenger freight or express trains which, as hereinbefore mentioned, normally carry 110 pounds in the brake pipe. When an emergency reduction in brake pipe pressure is effected, however, corresponding venting of fluid under pressure from diaphragm chamber 131 will permit the slower reducing quick action pressure in chamber 133 and acting on the opposite side of the diaphragm to move said diaphragm and associated stem 136 and slide valve 135 to its left-hand position as hereinbefore described. With the slide valve in its left-hand position it disconnects the passage 150 from the passage 141 and thereby the safety valve 140 from the brake cylinder 4, so as to render the safety valve ineffective and thus provide for obtaining in the brake cylinder 4 the usual high emergency pressure required for prompt stopping of the train.

It will be understood that to recharge the equipment and to effect a release of the brakes following either a service or an emergency application of the brakes on a short train, the brake pipe pressure will be increased in the usual manner and the control valve device 1 will operate in the same manner as hereinbefore described in connection with ordinary freight train service.

From the foregoing it will be noted that in the embodiment of the invention shown in Fig. 1, the addition of the filling piece or member 10 and changeover valve portion 11 to the usual "AB" brake equipment, such as disclosed in the aforementioned Farmer's patent, provides for use of this brake equipment on cars which are required to operate in both ordinary freight train service and high speed relatively short passenger freight or express service.

*Embodiment—Figure 2*

In Fig. 2 of the drawings there is illustrated a brake equipment employing a brake controlling valve device 200 embodying another form of the invention. In this embodiment of the invention, a changeover valve portion 201 including a brake cylinder pressure limiting valve device 203 and a quick application valve device 204 such as shown, described and claimed in the McClure application, Serial No. 460,045, filed September 29, 1942, now Patent No. 2,352,277, dated June 27, 1944, together with an auxiliary vent valve portion 205, is substituted for the changeover valve 11, previously described in connection with the embodiment shown in Fig. 1. The other parts of the brake apparatus including the service and emergency portions of the brake controlling valve device are identical in construction and operation with corresponding parts shown in Fig. 1 of the drawings, and similar reference numerals are therefore employed to indicate similar parts in both embodiments.

The changeover valve portion 201 comprises essentially the parts of the changeover valve device described in the aforementioned McClure application and for this reason will be but briefly described in the present application.

*Description*

The limiting valve device 203 comprises two oppositely disposed flexible diaphragms 212 and 213 which are operatively connected together by a strut 214. The diaphragm 212 is of greater area than diaphragm 213 and between the diaphragms is a chamber 215 which is in constant communication with the atmosphere through a restricted port 216. At the opposite side of diaphragm 212 is a chamber 217 which is in constant open communication with the brake pipe 5 by way of a passage 218, a passage 218a and passage 132 which latter passage, as hereinbefore described in connection with the equipment shown in Fig. 1, extends through the filling piece 10 where it is connected with the passage 20. At the opposite side of diaphragm 213 is a chamber 219 which is connected to the safety valve 140 by way of a passage 220.

The limiting valve device 203 further comprises a check valve 221 contained in a chamber 222 which is connected through a passage 223, a chamber 224, a passage 225 and connected passage 185 leading to the brake cylinder passage 65. This check valve has a fluted stem 226 slidably mounted in a bushing 227 mounted in a wall separating chambers 219 and 222, said check valve and stem being arranged in coaxial relation with the diaphragm 213 with the end of said stem engaging said diaphragm. A spring 228 acting on the check valve 221 is provided for urging same into sealing engagement with one end of the bushing 227 for closing communication between chambers 222 and chamber 219. Deflection of the diaphragms 212 and 213 in the direction of the right-hand will unseat check valve 221 from the end of bushing 227 to thereby open chamber 222 to chamber 219.

The quick application valve device 204 comprises two flexible diaphragms 230 and 231 arranged in coaxial relation and operatively connected together by a strut 232. The diaphragm 230 is of greater area than diaphragm 231 and between these diaphragms is a chamber 233 which is open to the atmosphere by way of chamber 215 and port 216. At the opposite face of diaphragm 230 is a chamber 234 which is connected through passage 234a to the passage 117 leading to the signal pipe 6. At the opposite side of diaphragm 231 is the chamber 224 which is open to the brake cylinder 4 by way of passages 225, 185 and brake cylinder passage 65.

The quick application valve device 204 further comprises a check valve 236 contained in a chamber 237 which is connected by passage 237a and passage 184 to the application and release passage 71. The check valve 236 has a fluted stem 238 slidably mounted in a bushing 239 which is secured in a bore through a wall separating chambers 224 and 237. The check valve 236 and stem 238 are arranged in coaxial relation with diaphragm 231 and the end of said stem engages the diaphragm. A spring 240 in chamber 237 acts on the check valve 236 for urging same into sealing contact with the adjacent end of bushing 239. Deflection of the diaphragms 230 and 231 in the direction of the right-hand will unseat the check valve 236 from the end of bushing 239.

The auxiliary vent valve portion 205 comprises a sectional casing 250 which in the present embodiment of the invention is mounted on the casing section 201 with a sealing gasket 251 interposed between. The casing 250 contains a vent valve mechanism comprising two flexible diaphragms 252 and 253 which are spaced apart and clamped around their peripheries in coaxial relation forming an intermediate chamber 254 which is in constant open communication with the quick action chamber 33 and emergency vent valve chamber 32 through a passage 255 and passage 134. The diaphragm 252 is of greater area than diaphragm 253 and at its outer face is a chamber 256 which is in constant open communication through a passage 257, passage 132 and connected passage 20 with the brake pipe 5. At the outer face of the smaller diaphragm 253 is a valve chamber 258 containing a valve piston 259 which is slidably mounted in a bore 260 in the casing, which bore is open at one end to a chamber 258 and at the other end to a chamber 261. The valve piston 259 is provided with a stem 262 which is operatively connected to the diaphragms 252 and 253, in any suitable manner, for movement therewith. A spring 263 disposed in chamber 256 acts through the medium of a diaphragm follower 264 on the diaphragm 252 and thereby the stem 262 and diaphragm 253 for urging said diaphragms, stem and thereby the valve piston 259 to the position in which they are shown in the drawings. With the valve piston in the position shown it engages a seat rib 265 which surrounds a passage 264 which is connected to the quick action chamber 33 and emergency valve chamber 32 through a chamber 266, passage 255, passage 134 and passage 34.

The vent valve mechanism further comprises a flexible diaphragm 267 having at one side a chamber 268 which is in constant open communication with the signal pipe 6 by way of passages 234a and 117. At the opposite side of the diaphragm 267 is the chamber 261 which is in constant open communication with the atmosphere through a passage 271. Contained in chamber 261 and engaging the diaphragm 267 is a diaphragm follower 272 provided with a plurality of spaced legs 273 which extend through a section 274 of the casing which projects into chamber 261. The outer ends of these legs are spaced away from the valve piston 259 in the position in which they are shown, which position is the one the diaphragm 267 and follower 272 will assume when the chamber 268 is at atmospheric pressure. This is the position which the diaphragm 267 and diaphragm follower 272 will assume in ordinary freight trains on which there is no use for a signal pipe.

OPERATION

Ordinary freight train service

If a car provided with this equipment is coupled into an ordinary freight train, the signal pipe 6 on the car will be devoid of fluid under pressure and chamber 234 at one side of diaphragm 230 in the application valve device 204 as well as chamber 268 at one side of diaphragm 267 in the auxiliary vent valve portion 205 will therefore be open to the atmosphere. Under these conditions the spring 240 disposed in chamber 237 of the application valve device will maintain the check valve 236 seated against the end of the bushing 239, and the spring 263 disposed in chamber 256 of the auxiliary vent valve device 205 will maintain the valve piston 259 seated against the seat rib 265.

In initially charging the equipment, fluid under pressure supplied to the brake pipe 5 flows to the various chambers in the service portion 8 and emergency portion 9 of the brake controlling valve device as well as to the auxiliary and emergency reservoir 3 and 4 in substantially the same manner as described under initial charging in ordinary freight train service in connection with the embodiment of the invention shown in Fig. 1 of the drawings. Fluid under pressure supplied to the brake pipe flows therefrom to the diaphragm chamber 217 in the limiting valve device and also to the diaphragm chamber 256 in the auxiliary vent valve device 205 by way of passage and pipe 21, passages 20, 132 and 218a. It might here be mentioned that brake pipe pressure in chamber 217 acting on the diaphragm 212 will deflect same and thereby the diaphragm 213 in the direction of the right-hand to unseat the check valve 221 and maintain in this position until such time as the brake pipe pressure is reduced to a chosen low degree, i. e., below that which results from a full service reduction. Such a reduction occurs upon an emergency reduction in brake pipe pressure. Fluid at brake pipe pressure supplied in the usual manner to the emergency valve chamber 32 and quick action chamber 33 of the brake controlling valve device flows therefrom to passage 134 from whence it flows by way of passage 255 to chamber 254 between the diaphragms 252 and 253 in the auxiliary vent valve portion 205. Fluid under pressure supplied to passage 255 also flows to chamber 266 in the auxiliary vent valve portion 205.

With chamber 256 charged to brake pipe pressure and chamber 254 at the opposite side of the diaphragm 252 charged to quick action chamber pressure the spring 263 plus the brake pipe pressure in chamber 256 will maintain the diaphragm assemblage including diaphragms 252 and 253, stem 262 and valve piston 259 in the position shown. The change-over valve portion 201 thus conditioned, will in no way alter or modify the usual operating characteristics of the service and emergency portions of the brake controlling valve device, and as a consequence the brake equipment on the car will then operate in its various positions to control the car brakes in harmony with the control of the brakes on all other cars in the train in identically the same manner as hereinbefore described in connection with the embodiment of the invention shown in Fig. 1.

Short train high speed service

When a car equipped with the brake controlling valve device 200 shown in Fig. 2 is coupled into a short high speed passenger freight or express train, the charging of the signal pipe on the train will provide fluid under pressure in chambers 234 and 268 of the application valve device 204 and the auxiliary vent valve device 205, respectively. The signal pipe pressure acting on the diaphragm 230 will deflect same and thereby the diaphragm 231 in the direction of the right-hand to unseat the check valve 236. The signal pipe pressure acting on the diaphragm 267 will cause it to deflect in a direction toward the left-hand. Deflection of the diaphragm 267 in this direction causes the diaphragm follower 272 to move in the same direction until brought to a stop by the legs 273 engaging the valve piston 259.

The opening of check valve 236 connects the brake application and release passage 71 through passage 184, passage 237a, chamber 237, past unseated check valve 236, chamber 224, passage 225 and passage 185 to the brake cylinder passage 65 thereby opening a by-pass around the brake cylinder build-up control valve mechanism 50. As a result, when an emergency application of the brakes is effected, fluid under pressure will be supplied to the brake cylinder 4 past the check valve 236 at the relatively rapid rate desired in high speed short train service.

When an emergency reduction in brake pipe pressure is effected, the brake pipe pressure in chamber 256, acting on one side of diaphragm 252, and the quick action chamber pressure in chamber 254, acting on the opposite side of the diaphragm, will be reduced. It will be understood, however, that the reduction in brake pipe pressure in chamber 256 will be at a more rapid rate than the reduction in quick action chamber pressure in chamber 254, thus the higher pressure in chamber 254, tending to flex the diaphragm 252 in a direction toward the left-hand plus signal pipe pressure in chamber 268 acting through the medium of the follower 272, causes the diaphragm assemblage including diaphragms 252 and 253, stem 262 and valve piston 259 to move in a direction toward the left-hand against the opposing pressure of spring 263 until brought to a stop by the valve piston 259 engaging a stop 299. With the valve piston in this position it will of course be out of engagement with the seat rib 265, so that communication is established between chambers 266 and 261. With the valve piston thus unseated fluid under pressure in the emergency valve chamber 32, quick action chamber 33 and chamber 254 in the auxiliary vent valve device 205 is vented to the atmosphere by way of passage 255, chamber 266, passage 264 past unseated valve piston 259, chamber 261 and passage 271. This venting is in addition to the venting of fluid under pressure through port 102 in the vent valve piston 99 and thus permits a quicker release of the brakes after an emergency application than is obtainable in ordinary freight train service.

As hereinbefore mentioned, the brake pipe pressure in chamber 217 of the limiting valve portion 203 of the change-over portion 201 holds the check valve 221 open until such time as the brake pipe pressure is reduced to a chosen low degree. As a result, the safety valve 140 will be effective to limit to the desired degree the pressure obtained in the brake cylinder 4 upon a full service reduction in brake pipe pressure. When an emergency reduction in brake pipe pressure is effected, however, the corresponding venting of fluid under pressure from diaphragm chamber 217 will permit brake cylinder pressure and the pressure of spring 228 in chamber 222 acting on the check valve 221 to seat said check valve and thereby disconnect the safety valve device 140 from the brake cylinder 4 so as to render the safety valve device ineffective, thus providing for the obtaining in the brake cylinder 4 of the usual high emergency pressure required for prompt stopping of the train in high speed service.

When it is desired to recharge the equipment and to effect a release of the brakes following an emergency application, the pressure in the brake pipe 5 is increased and the service and emergency portions of the brake controlling valve device 200 operate in the same manner as hereinbefore described in connection with the brake controlling valve device 1 shown in Fig. 1. The consequent increase in pressure of fluid in the chamber 256 of the auxiliary vent valve device 205, plus the pressure of spring 263 acting on the diaphragm 252 causes the diaphragm assemblage including diaphragms 252 and 253, stem 262 and valve piston 259 to move in the direction of the right-hand until brought to a stop by the valve piston 259 coming into contact with its seat rib 265 thus closing communication between chambers 261 and 266 and thereby communication between the emergency valve chamber 32 and quick action chamber 33 and the atmosphere. With this communication cut off, the quick action chamber and emergency valve chamber are again recharged in the usual manner with fluid at brake pipe pressure. In this connection it will be noted that when the pressure in the brake pipe and thereby the chamber 256 is increased to effect a release of the brakes following an emergency application, the quick action chamber and thereby the chamber 254 in the auxiliary vent valve device 205 is at atmospheric pressure so that only a slight increase in brake pipe pressure is required in chamber 256 to effect movement of the valve piston into engagement with the seat rib 265 as shown and thus permit the quick action chamber to be recharged with fluid at brake pipe pressure without any delay.

SUMMARY

It will now be noted that both brake controlling valve devices 1 and 200 shown in Figs. 1 and 2, respectively, of the drawings are automatically adjustable or conditionable for either ordinary freight train service or short fast passenger freight or express train service to provide the desired brake operating characteristics called for in each of said services. With either of the brake controlling valve devices the automatic conditioning for short high speed train service is obtainable by the pressure employed in the signal pipe of such trains, while the conditioning for ordinary freight train service is obtainable automatically due to the absence of a signal pipe on such trains.

Having now described our invention what we claim as new and desire to secure by Letters Patent is:

1. In a fluid pressure brake, in combination, a brake pipe, a signal pipe, a quick action chamber, movable abutment means subject to signal pipe pressure and the opposing pressures of the brake pipe and quick action chamber and operative upon an emergency reduction in brake pipe pressure with the signal pipe charged with fluid under pressure to open a vent from the quick action chamber, and resilient means associated with said movable abutment means for rendering said movable abutment means ineffective to open said vent from the quick action chamber upon an emergency reduction in brake pipe pressure with the signal pipe devoid of fluid under pressure.

2. In a fluid pressure brake, in combination, a brake pipe, a signal pipe, a quick action chamber, valve means including a first movable abutment subject to signal pipe pressure and a second movable abutment subject to the opposing pressures of the brake pipe and quick action chamber, said valve means being operative upon an emergency reduction in brake pipe pressure with the signal pipe charged with fluid under pressure to open a vent from the quick action chamber and spring means for rendering said valve means ineffective to open the vent from the quick action chamber upon an emergency reduction in brake pipe pressure with the signal pipe devoid of fluid under pressure.

3. In a fluid pressure brake, in combination, a brake pipe, a signal pipe, a quick action chamber, a communication through which fluid under pressure may be vented from the quick action chamber, valve means for controlling said communication, movable abutment means for controlling said valve means, said movable abutment means comprising a first flexible diaphragm subject to signal pipe pressure and a second flexible diaphragm subject to the opposing pressures of the brake pipe and quick action chamber and operative upon an emergency reduction in brake pipe pressure when the signal pipe is charged with fluid under pressure to effect operation of said valve means to open said communication, and means for rendering said movable abutment means ineffective to effect operation of said valve means to open said communication upon an emergency reduction in brake pipe pressure with the signal pipe devoid of fluid under pressure.

4. In a fluid pressure brake, in combination, a brake pipe, a signal pipe, a quick action chamber, an emergency valve device controlled by the opposing pressures of said brake pipe and quick action chamber and operative upon an emergency rate of reduction in brake pipe pressure to effect an emergency application of the brakes and to establish a communication for releasing fluid under pressure from said chamber, means for restricting the release of fluid under pressure from said chamber to provide for a certain rate of reduction in pressure in said chamber, other valve means subject to signal pipe pressure and the opposing pressures of the brake pipe and quick action chamber and operative upon an emergency reduction in brake pipe pressure with the signal pipe charged with fluid under pressure to open an auxiliary communication for releasing fluid under pressure from said chamber to provide for a faster rate of reduction in pressure in said chamber than provided for by said restricted means, and means for rendering said other valve means ineffective to open said auxiliary communication upon an emergency reduction in brake pipe pressure with the signal pipe devoid of fluid under pressure.

5. In a fluid pressure brake, in combination, a brake pipe, a signal pipe, a quick action chamber, an emergency valve device controlled by the opposing pressures of said brake pipe and quick action chamber and operative upon an emergency rate of reduction in brake pipe pressure to effect an emergency application of the brakes and to establish a communication for releasing fluid under pressure from said chamber, means for restricting the release of fluid under pressure from said chamber to provide for a certain rate of reduction in pressure in said chamber, other valve means subject to signal pipe pressure and the opposing pressures of the brake pipe and quick action chamber and operative upon an emergency reduction in brake pipe pressure with the signal pipe charged with fluid under pressure to also release fluid under pressure from said chamber to accelerate the rate of reduction in the pressure of fluid in the chamber, a choke for restricting the release of fluid under pressure from said chamber by said other valve means said other valve means being rendered ineffective to release fluid under pressure from said chamber upon an emergency reduction in brake pipe pressure when the signal pipe is devoid of fluid under pressure.

6. In a fluid pressure brake, in combination, a brake pipe, a signal pipe, a quick action chamber, an emergency valve device controlled by the opposing pressures of said brake pipe and quick action chamber and operative upon an emergency rate of reduction in brake pipe pressure to effect an emergency application of the brakes and to establish a communication for releasing fluid under pressure from said chamber, means for restricting the release of fluid under pressure from said chamber to provide for a certain rate of reduction in pressure in said chamber, another communication for releasing fluid under pressure from said quick action chamber, valve means having a normal position for closing said other communication and another position for opening same, and movable abutment means subject to signal pipe pressure and the opposing pressures of the brake pipe and quick action chamber for controlling the position of said valve means and operative upon an emergency reduction in brake pipe pressure only when said signal pipe is charged with fluid under pressure to position said valve means in its communication opening position.

7. In a fluid pressure brake, in combination, a brake pipe, a signal pipe, a quick action chamber, a source of fluid under pressure, a controlling valve device operative upon a reduction in brake pipe pressure to supply fluid under pressure from said source through a communication to effect an application of the brakes, means operative to control the flow of fluid under pressure through said communication to provide a certain degree of braking in a certain interval of time, a by-pass communication around said means to provide said certain degree of braking in a shorter interval of time, a passage through which fluid under pressure may be released from said chamber, valve means subject to signal pipe pressure and the opposing pressures of the brake pipe and quick action chamber and operative upon an emergency reduction in brake pipe pressure with the signal pipe charged with fluid under pressure to open said by-pass communication and said passage, and means for rendering said valve means ineffective to open said by-pass communication and said passage upon an emergency reduction in brake pipe pressure with the signal pipe devoid of fluid under pressure.

8. In a fluid pressure brake in combination, a brake pipe, a brake cylinder, a service valve device operative upon either a service or an emergency rate of reduction in brake pipe pressure to supply fluid under pressure to said brake cylinder for effecting an application of brakes, a quick action chamber, an emergency valve device controlled by the opposing pressures of said brake pipe and quick action chamber and operative upon a service reduction in brake pipe pressure to effect a service rate of reduction in pressure in said quick action chamber and upon an emergency reduction in brake pipe pressure to supply fluid under pressure to said brake cylinder and to also effect venting of fluid under pressure from quick action chamber at a chosen rate, a safety valve, a signal pipe, valve means subject to signal pipe pressure and the opposing pressures of the brake pipe and quick action chamber having a normal position for connecting said safety valve to said brake cylinder and operative from said normal position only upon an emergency reduction in brake pipe pressure with the signal pipe charged with fluid under pressure to disconnect said safety valve from the brake cylinder and to open a second vent from said quick action chamber to increase the rate of reduction in pressure therein, and means for rendering said valve means ineffective to open the second vent from the quick action chamber upon an emergency reduction in brake pipe with the signal pipe devoid of fluid under pressure.

9. In a fluid pressure brake in combination, a brake pipe, a brake cylinder, a service valve device operative upon either a service or an emergency rate of reduction in brake pipe pressure to supply fluid under pressure to said brake cylinder for effecting an application of brakes, a quick action chamber, an emergency valve device controlled by the opposing pressures of said brake pipe and quick action chamber and operative upon a service reduction in brake pipe pressure to effect a service rate of reduction in pressure in said quick action chamber and upon an emergency reduction in brake pipe pressure to supply fluid under pressure to said brake cylinder and to also effect venting of fluid under pressure from quick action chamber at a chosen rate, valve means for retarding the flow of fluid under pressure from said service and emergency valve device to said brake cylinder, said valve means being controlled by said emergency application valve device and being rendered effective thereby upon an emergency reduction in brake pipe pressure and ineffective at other times, a by-pass communication around said valve means to provide for a faster flow of fluid under pressure to the brake cylinder, a safety valve, a signal pipe, valve means subject to signal pipe pressure and the opposing pressures of the brake pipe and quick action chamber having a normal position for closing said by-pass communication and for connecting said safety valve to said brake cylinder and operative from said normal position only upon an emergency reduction in brake pipe pressure with the signal pipe charged with fluid under pressure to open said by-pass communication and to disconnect said safety valve from the brake cylinder and to open a second vent from said quick action chamber to increase the rate of reduction in pressure therein, and means for rendering said valve means ineffective to open the by-pass communication and the second vent from the quick action chamber upon an emergency reduction in brake pipe pressure with the signal pipe devoid of fluid under pressure.

10. In a fluid pressure brake, in combination, a brake pipe, a brake cylinder, an auxiliary reservoir, an emergency reservoir, a quick action chamber, a service valve device operative upon either a service or an emergency reduction in brake pipe pressure to supply fluid under pressure from said auxiliary reservoir to said brake cylinder, an emergency valve device operative upon a service reduction in brake pipe pressure to effect a reduction in pressure in said quick action chamber and upon an emergency reduction in brake pipe pressure to supply fluid under pressure from said emergency reservoir to said brake cylinder and also effect venting of fluid under pressure from the quick action chamber at a chosen rate, a safety valve for limiting the pressure of fluid in said cylinder, an auxiliary passage through which fluid under pressure may also be vented from the quick action chamber to increase the rate of reduction therein, a signal pipe, valve means separate from said service and emergency valve devices controlling communication between said safety valve device and brake cylinder, and for also controlling said auxiliary passage, said valve means being subject to signal pipe pressure and the opposing pressures in the brake pipe and quick action chamber and operative only upon an emergency reduction in brake pipe pressure with the signal pipe charged with fluid under pressure to open said auxiliary passage and to close said communication.

11. In a fluid pressure brake, in combination, a brake pipe, a signal pipe, a quick action chamber, an emergency valve device controlled by the opposing pressure of said brake pipe and quick action chamber and operative upon an emergency rate of reduction in brake pipe pressure to effect an emergency application of the brakes and to establish a communication for releasing fluid under pressure from said chamber, means for restricting the release of fluid under pressure from said chamber to provide for a certain rate of reduction in pressure in said chamber, an auxiliary communication for releasing fluid under pressure from said chamber to provide for a faster rate of reduction in pressure in said chamber than provided for by said restricted means, valve means controlled by the opposing pressure of said brake pipe and quick action chamber and operative by the pressure of fluid in said quick action chamber upon an emergency reduction in brake pipe pressure to open said auxiliary communication, a spring, and means controlled by the opposing pressures of fluid in said signal pipe and of said spring for rendering said valve means effective to open said auxiliary communication upon effecting an emergency reduction in brake pipe only when said signal pipe is charged with fluid under pressure.

12. In a fluid pressure brake, in combination, a brake pipe, a signal pipe, a quick action chamber, an emergency valve device controlled by the opposing pressure of said brake pipe and quick action chamber and operative upon an emergency rate of reduction in brake pipe pressure to effect an emergency application of the brakes and to establish a communication for releasing fluid under pressure from said chamber, means for restricting the release of fluid under pressure from said chamber to provide for a certain rate of reduction in pressure in said chamber, an auxiliary communication for releasing fluid under pressure from said chamber to provide for a faster rate of reduction in pressure in said chamber than provided for by said restricted means, valve means including a spring and a movable abutment subject to the opposing pressures of said signal pipe and of said spring for opening said auxiliary communication with said signal pipe charged with fluid under pressure and for maintaining said auxiliary communication closed when said signal pipe is void of fluid under pressure, and other valve means interposed in said auxiliary communication subject to the opposing pressures of said brake pipe and quick action chamber having a normal position for closing said auxiliary communication and being operative by quick action chamber pressure upon an emergency reduction in brake pipe pressure to open said auxiliary communication.

13. In a fluid pressure brake, in combination, a brake pipe, a signal pipe, a quick action chamber, an emergency valve device controlled by the opposing pressure of said brake pipe and quick action chamber and operative upon an emergency rate of reduction in brake pipe pressure to effect an emergency application of the brakes and to establish a communication for releasing fluid under pressure from said chamber, means for restricting the release of fluid under pressure from said chamber to provide for a certain rate of reduction in pressure in said chamber, an auxiliary communication for releasing fluid under pressure from said chamber to provide for a faster rate of reduction in pressure in said chamber than provided for by said restricted means, and valve means interposed in said auxiliary communication for controlling the flow of fluid under pressure therethrough, said valve means including movable abutment means subject to the opposing pressures of said brake pipe and quick action chamber and operative by quick action chamber pressure upon an emergency reduction in brake pipe pressure when said signal pipe is charged with fluid under pressure to open said auxiliary communication and operative upon a subsequent slight increase in brake pipe to close said auxiliary communication.

14. In a fluid pressure brake, in combination, a brake pipe, a signal pipe, a quick action chamber, an emergency valve device controlled by the opposing pressure of said brake pipe and quick action chamber and operative upon an emergency rate of reduction in brake pipe pressure to effect an emergency application of the brakes and to establish a communication for releasing fluid under pressure from said chamber, means for restricting the release of fluid under pressure from said chamber to provide for a certain rate of reduction in pressure in said chamber, an auxiliary communication for releasing fluid under pressure from said chamber to provide for a faster rate of reduction in pressure in said chamber than provided for by said restricted means, valve means subject to the opposing pressures of brake pipe and quick action chamber and operative by quick action chamber pressure upon an emergency reduction in brake pipe pressure to open said auxiliary communication and operative upon a subsequent slight increase in brake pipe to close said auxiliary communication, and valve means interposed in said auxiliary communication subject to the opposing pressures of the signal pipe and a spring for selectively rendering said valve means effective or ineffective to open said auxiliary communication.

15. In a fluid pressure brake, in combination, a brake pipe normally charged with fluid under pressure, a quick action chamber normally charged with fluid under pressure, a vent communication from said chamber, a signal pipe, a valve piston having a normal position for closing said vent communication and movable to another position for opening said vent communication, and actuating means for moving said valve piston from said normal position to said other position, said actuating means comprising a first movable abutment subject to signal pipe pressure and a second movable abutment subject to quick action chamber pressure and the opposing pressure of fluid in the brake pipe and a spring, said first and said second movable abutment cooperating to actuate said valve piston from said normal to said other position upon effecting an emergency reduction in brake pipe pressure only when the signal pipe is charged with fluid under pressure.

16. In a fluid pressure brake, in combination, a brake pipe normally charged with fluid under pressure, a quick action chamber normally charged with fluid under pressure, a vent communication from said chamber, a signal pipe, a valve piston having one position for opening said vent communication and another position for closing said vent communication, means for controlling said valve piston comprising a pair of movable abutments one of said pair being subject to signal pipe pressure and the other of said pair being subject to the opposing pressure of the brake pipe and the quick action chamber, said abutments cooperating upon an emergency reduction in brake pipe pressure with the signal pipe charged with fluid under pressure to actuate said valve piston to said one position, and spring means for actuating said valve means to said other position upon a subsequent slight increase in brake pipe pressure.

17. In a fluid pressure brake, in combination, a brake pipe normally charged with fluid under pressure, a signal pipe charged with fluid under pressure in one class of train service and devoid of fluid under pressure in another class of train service, valve means operative to establish a venting communication from the quick action chamber, said valve means being conditioned by signal pipe pressure when the signal pipe is charged for providing for the venting of fluid under pressure from the quick action chamber, and said valve means being subject to the opposing pressures of the brake pipe and quick action chamber and operative upon a reduction in brake pipe pressure for effecting the venting of fluid from the quick action chamber, and means for rendering said valve means ineffective to provide for the venting of fluid under pressure from the quick action chamber upon an emergency reduction in brake pipe pressure with the signal pipe devoid of fluid under pressure.

JOHN CANETTA.
CHARLES F. HAMMER.